United States Patent
Koh et al.

(10) Patent No.: US 8,069,235 B2
(45) Date of Patent: Nov. 29, 2011

(54) METHOD AND DEVICE FOR MANAGING A PEER RELATIONSHIP IN A DATA COMMUNICATION NETWORK

(75) Inventors: Tien-Ming Benjamin Koh, Singapore (SG); Hong Cheng, Singapore (SG); Tetsuro Morimoto, Kanagawa (JP); Takashi Aramaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 803 days.

(21) Appl. No.: 11/995,198

(22) PCT Filed: Jul. 14, 2006

(86) PCT No.: PCT/JP2006/314440
§ 371 (c)(1),
(2), (4) Date: Jan. 9, 2008

(87) PCT Pub. No.: WO2007/011007
PCT Pub. Date: Jan. 25, 2007

(65) Prior Publication Data
US 2009/0037567 A1    Feb. 5, 2009

(30) Foreign Application Priority Data
Jul. 15, 2005  (JP) .................................. 2005-207807

(51) Int. Cl.
*G06F 13/00* (2006.01)
(52) U.S. Cl. ..................................................... 709/223
(58) Field of Classification Search .................... 709/223
See application file for complete search history.

(56) References Cited

U.S. PATENT DOCUMENTS

| 5,758,282 | A  | 5/1998  | Yamashina |
| 6,272,145 | B1 | 8/2001  | Malkin    |
| 6,519,231 | B1 | 2/2003  | Ding      |
| 2003/0026230 | A1 | 2/2003 | Ibanez   |
| 2003/0223450 | A1 | 12/2003 | Bender  |
| 2004/0022232 | A1 | 2/2004 | Reinders |
| 2004/0030769 | A1 | 2/2004 | Lim      |
| 2004/0056890 | A1 | 3/2004 | Hao      |
| 2004/0174904 | A1 | 9/2004 | Kim      |
| 2004/0236855 | A1 | 11/2004 | Peles   |
| 2004/0258007 | A1 | 12/2004 | Nam     |

(Continued)

FOREIGN PATENT DOCUMENTS

EP    1 489 817    12/2004

(Continued)

OTHER PUBLICATIONS

International Search Report dated Oct. 9, 2006.

(Continued)

*Primary Examiner* — Robert B Harrell
(74) *Attorney, Agent, or Firm* — Dickinson Wright PLLC

(57) ABSTRACT

A technology is disclosed for efficiently managing the peer relationship, and in particular for allowing to discover which of one or more communication links of the network entity is connected to the same network entity. According to this technology, for example, the ID Controller (202) of the network entity (201) generates a unique identifier for the network entity from all the physical address on its multiple interfaces. The peer relationship controller (203) verifies if the generated unique identifier is overlapping with that of another network entity. The link control logic (205), upon sending a message to the network entity associated with the unique identifier, determines correspondence of the unique identifier with the peer network entity to interchangeably use the communication links (link 1 (211) to link n (213)).

30 Claims, 4 Drawing Sheets

U.S. PATENT DOCUMENTS

2005/0044273 A1 2/2005 Bouchat
2005/0117525 A1* 6/2005 Poustchi et al. .............. 370/254

FOREIGN PATENT DOCUMENTS

| EP | 1 494 433 | 1/2005 |
| WO | 00/48419 | 8/2000 |

OTHER PUBLICATIONS

R. Moskowitz, et al. "Host Identity Protocol (HIP),", Internet Draft: draft-ietf-hip-base-03.txt, Jun. 23, 2005, pp. 1-96.

D. Eastlake, 3rd, et al., "US Secure Hash Algorithm 1 (SHA1)," RFC3174, Sep. 2001, pp. 1-22.

* cited by examiner

METHOD AND DEVICE FOR MANAGING A PEER RELATIONSHIP IN A DATA COMMUNICATION NETWORK

TECHNICAL FIELD

The present invention pertains to the link management system for the multiple links in the data communication system which enables data communication using the data communication network.

BACKGROUND ART

With the development in communication technology, multiple communication interface devices become widely available and deployed. For example, a laptop computer would have Ethernet, Wireless Local Area Network (WLAN) and Bluetooth interfaces, and a handheld device would have both WLAN and cellular interfaces. Usually an application session can make use of several or all of these interfaces on a device, e.g. during a mobile handover, or when multi-homing is used. It is also possible that the communication peer is a multi-interface device. In this case, a method to discovery the peer relationship and identify each other is required for a successful communication.

Traditionally, a device identifies its peer with the link address, e.g. IP (Internet Protocol) address, Media Access Control (MAC) address, etc. However, this method is not workable with the multiple link case. When both peers have multiple links interconnected, using one link address cannot properly represent the relationship between the links. For example, as depicted in FIG. 1, Network Entity A (101) has multiple links connected to the Network Entity B (102), e.g. Link 1 (111) to Link n (113). At the same time, Network Entity A (101) has multiple links connected to the Network Entity C (103), e.g. Link m (114) to Link k (115). In this case, referring to Network Entity B (102) with its link address on Link 1 (111) would cause confusion at Network Entity A (101). This is because for example, the Network Entity C (103) could use the same link address on Link m (114). Since Link 1 (111) and Link m (14) may be in different network domains, there is no way to prevent the same link address being used by different entities. The problem cannot be solved even with concatenating Network Entity A (101)'s own link address, because it may use the same link address on Link 1 (111) and Link 2 (112).

Using the link address to identify the peer faces another problem in this heterogeneous environment. As described before, the different links may use different technologies, and thus different address format would be utilized. For example, the link address utilized in a cellular network is different from that used in the WLAN. Therefore, using the link address will result in incompatible identifiers over different links. For example, Network Entity A (101) may not be able to decide if the entities behind Link 2 (112) and Link n (113) are the same, since different identifier formats are used.

[Patent Document 1] U.S. Patent Publication 20040236855 A1

[Patent Document 2] U.S. Patent Publication 20040056890 A1

[Non-Patent Document 1] P. Jokela, et al, "Host Identity Protocol (HIP)", Internet Draft: draft-ietf-hip-base-03.txt, Jun. 23, 2005

[Non-Patent Document 2] D. Eastlake, $3^{rd}$. P. Jones, "US Secure Hash Algorithm 1 (SHA1)", RFC3174, September 2001

There are some existing efforts to solve the multiple link related problem. One of the solutions is the Internet Engineering Task Force (IETF) Host Identity Protocol (HIP) Working Group proposals (the above Non-Patent Document 1). In the Non-Patent Document 1, the protocol provides a method of separating the end-point identifier and locator roles of IP addresses. Hence, a terminal may be uniquely identified using its Host Identifier, but may still be reachable via its multiple IP addresses. However, the HIP is meant as an end-to-end solution, and not efficient for a peer-to-peer scenario. The HIP requires 4 messages change processes, puzzle computation, and a solution between the $2^{nd}$ and $3^{rd}$ initialization packets. What is more, the HIP requires the support of a directory query, e.g. DHCP, which may further impact efficiency for a peer-to-peer solution. Besides the above, the IP centric design of the HIP also makes it not apply to the scenarios where only layer 2 is available between the peers.

There is also Multi-link tunneling described in the above Patent Document 1 as another solution. This Multi-link tunneling uses tunnel device to implement Virtual Private Network (VPN) services with upper layer transparency of multi-homing via multiple routes. However, this solution uses the IP address to identify the links, which is again not applicable for those layer 2 only links. The solution also does not apply to heterogeneous media and multiple security procedures. Therefore, it does not solve the problems in environment depicted in FIG. 1.

Another attempt for solving the problem is presented in the above Patent Document 2. In this solution, client's signature is used to identify the remote node that is in communication with itself. Obviously, this solution requires the client signature be available for each possible communication peer, which is impossible for two new nodes. The solution also specifies Extensible Markup Language (XML) as storage format, which is higher layer information that may not be proper for lower layers, e.g. Layer 2. This solution also does not fully address the security issue, and only the identification is provided.

SUMMARY OF THE INVENTION

It is an object of the present invention to solve the above discussed problems. In particular, it is an object of the present invention to promptly and efficiently discovering and identifying peer relationship in a heterogeneous media environment. Another object of the invention is that the peer verifies the peer relationship in the further communication between the peers.

To attain the above-mentioned object of the present invention, the present invention provides a system for managing a peer relationship in a data communication network comprising a network entity which has a single or plurality of communication links, whereby the network entity is capable of discovering and identifying which of one or more communication links of the network entity is connected to the same other network entity.

In an aspect of the present invention, the network entity further comprises an identifier controller and a peer relationship controller, wherein the identifier controller is capable of generating a unique identifier for the network entity, whereby the peer relationship controller is capable of verifying if the generated unique identifier is overlapping with that of another network entity.

In another aspect of the present invention, the network entity further comprises a link control logic, wherein the link control logic is capable of interchangeably using the communication links identified by a list of internal link identifier or local link Identifier as associated with a unique identifier provided by the peer relationship controller (or stored in its management buffer) when delivering a message to a network entity associated with the unique identifier.

The present invention has the advantage that a network entity is capable of discovering and identifying which of one or more communication links of the network entity are connected to the same other network entity.

BEST MODE FOR CARRYING OUT THE INVENTION

In the following description, for purpose of explanation, specific numbers, times, structures and other parameters are set forth in order to provide a thorough understanding of the present invention. However, it will be apparent to anyone skilled in the art that the present invention may be practiced without these specific details.

Figure 1:
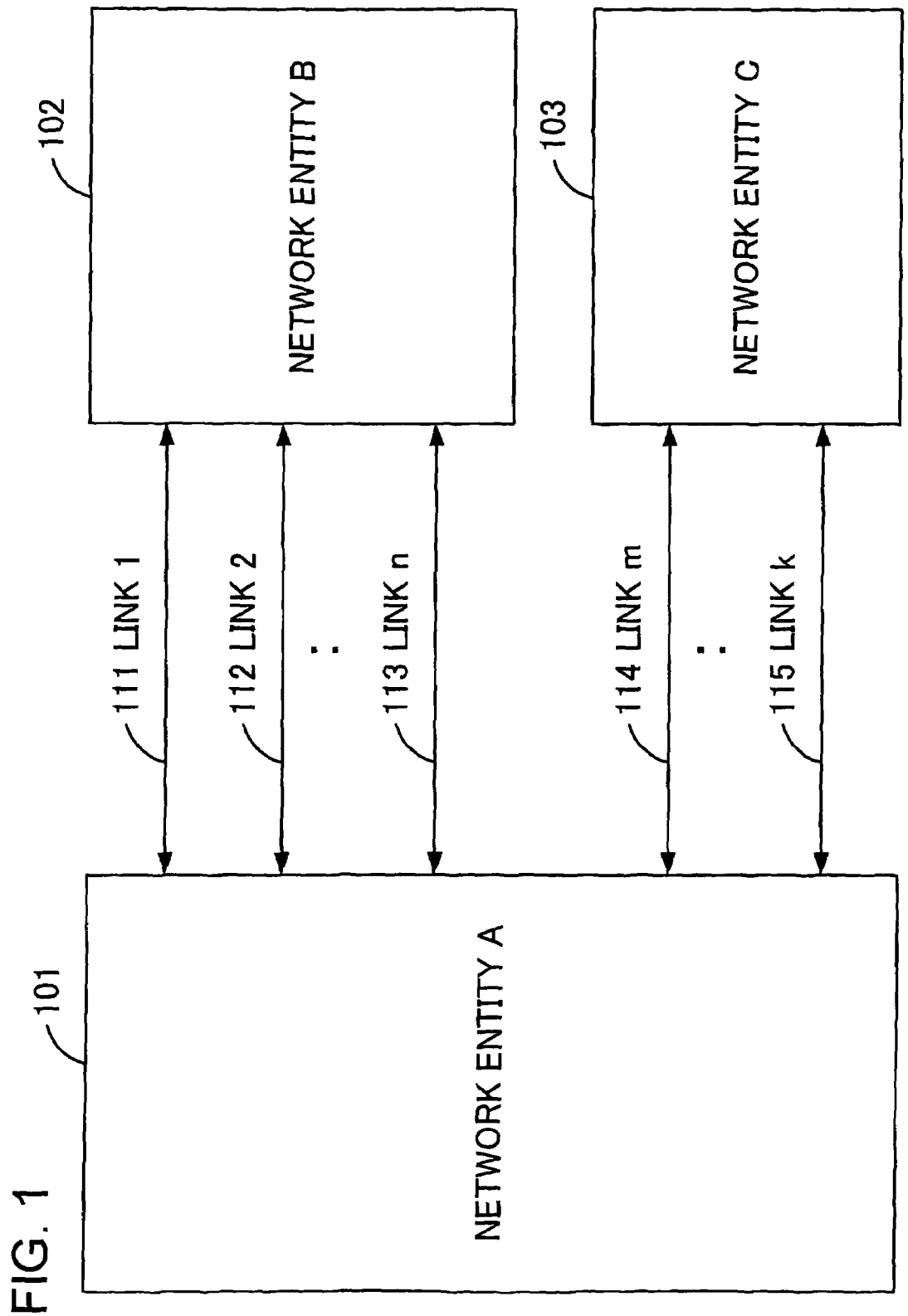
FIG. 1 is a diagram showing an example of the scenario where multiple links are involved in the communication between multi-interface network entities in both the embodiment of the present invention and the Prior art.
Figure 2:
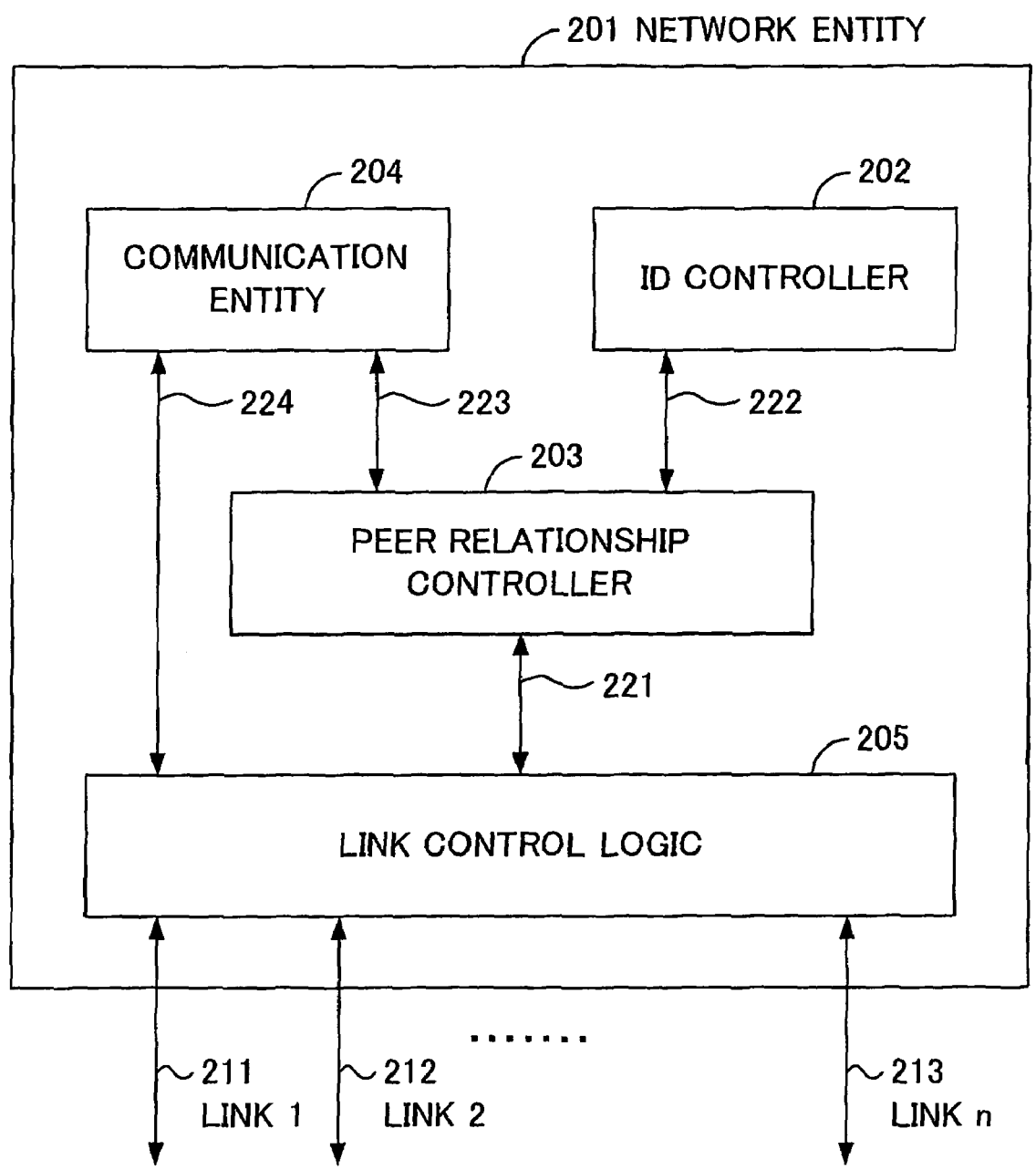
FIG. 2 is a diagram showing an example of architecture of the network entity in the embodiment of the present invention.

With reference to FIG. 2, an example architecture for a Network Entity (201) that implements the present invention is described. FIG. 1 is a diagram showing an example of the scenario were multiple links are involved in the communication between multi-interface network entities in both the embodiment of the present invention. This architecture applies for all the network entities involved in the communication.

As shown in the FIG. 2, there are four major parts in the system, namely, Identifier Controller (ID Controller) (202), Peer Relationship Controller (203), Communication Entity (204) and Link Control Logic (205).

The ID Controller (202) is in charge of unique identifier creation for the Network Entity (201). This unique identifier is to be generated from certain unique characteristics of the Network Entity (201), so that it will not overlap with any other network entities' identifiers. For example, the ID Controller (202) can take all the physical address of its interfaces and perform a certain function to generate the identifier. An example method is as:

Network Entity Identifier::=H (MAC1|MAC2| , , , |MACn);

wherein the H is the hash function, e.g. SHA1 (see the Non-Patent Document 2), and MAC1 to MACn are the physical addresses of the links on Network Entity (201). It is obvious to anyone skilled in the art that other functions could be used for the identifier generation without affecting general principle of the present invention.

Since only the physical address information of the links is used for the identifier generation, the scheme can be implemented independent of higher layer existence. Therefore, the solution can work with network entities that contains only layer 2 protocol stack.

It is obvious to anyone skilled in the art that other information than the physical addresses could also be used for the identifier generation, which depends on availability. For example, the extra information includes IP addresses, identifier of the network the link associated to, user subscription identity, etc.

The unique identifier only needs to be generated once during the Network Entity (201) boot up time. This unique identifier can then be used on all its interfaces later. Another case for regenerating the identifier is when the Peer Relationship Controller (203) returns an error during the peer discovery phase. Although the identifier generated by the ID Controller (202) has a high chance of uniqueness, it still may overlap with the other network entities' identifier.

For example, as shown in the FIG. 1, the Network Entity B (102) and Network Entity C (103) can use the same physical address combination, and thus have an identical identifier generated. Although the possibility is extremely slim, the present invention provides a way to handle in the peer relationship discovery phase when the same identifier is generated at the different network entities.

The Peer Relationship Controller (203) is the component that handles the network entity peer relationship discovery and management. When links of the Network Entity (201) have established connection with the peer, a Peer-Discovery message will be sent to the peer for the relationship management. The Peer-Discovery message will be sent over each of the links that has an active connection, e.g. Link 1 (211) to Link n (213). Information included in the Peer-Discovery message will be used by the receiving entity to identify its relationship with the sending entity. A Discovery Logic inside the Peer Relationship Controller (203) is in charge of generating the proper Peer-Discovery message for each of the link. A possible implementation of the Peer-Discovery message comprises information about the unique identifier of the Network Entity (201), a local identifier of the link at the Network Entity (201) (internal link identifier), a link specific token that helps for verification. An example format of the message is as below:

Peer-Discovery::=
[Message Type::=Peer-Discovery]
[Network Entity Identifier]
[Internal Link Identifier]
[Link Specific Token]

wherein the Message Type is used to distinguish the Peer-Discovery message from other messages. The Network Entity Identifier is generated by the ID Controller (202) as described above. This identifier is passed from the ID Controller (202) to the Peer Relationship Controller (203) through interface 222. The Internal Link Identifier is an identifier the Network Entity (201) uses to indicate its interface or links locally. For example, this could be a simple integer number. Therefore, the value of this element varies based on which link the message is sent on.

The Link Specific Token is an information element helping in the verification of peer relationship. This Link Specific Token varies for different links. For example, it could be a random number generated by the Peer Relationship Controller (203) at the time the Peer-Discovery message is formed. Therefore, the Peer-Discovery messages sent over Link 1 (211) should contain a different Link Specific Token from that of the message sent over Link 2 (212).

The Peer-Discovery message will be sent from the Peer Relationship Controller (203) to the Link Control Logic (205) through the interface (221). And the Link Control Logic (205) will forward the Peer-Discovery message out on the corresponding link, e.g. Link 1 (211) to Link n (213).

At peer side of the link, the received Peer-Discovery message will be delivered to the Peer Relationship Controller (203). For example, if the Peer-Discovery message is sent from Network Entity A (101) over Link 1 (111) towards Network Entity B (102), it will be forwarded to the Peer Relationship Controller (203) of the Network Entity B (102) by its Link Control Logic (205) through the interface (221). Information will be necessarily exchanged between the Peer Relationship Controller (203) and the Link Control Logic (205) or the Communication Entity (204) through the interface (203) or (204) when needed. The transport of the Peer-Discovery message over the links depends on the underlying media technology used. For example, if the link is using the IEEE802 technology, an ether type could be used to identify that the message is for the peer relationship control. The Link Control Logic (205) at the receiving end will recognize the message correctly based on the ether type and the message type, and pass it towards the Peer Relationship Controller (203) accordingly.

As shown in FIG. 1, there could be multiple links between two network entities, e.g. Link 1 (111) to Link n (113) between Network Entity A (101) and Network Entity B (102). Therefore, a network entity could receive multiple Peer Discovery messages from the same source. Since the Peer-Discovery messages from the same Network Entity are sent out at around the same time, and they should be received at around the same time as well.

Figure 3:
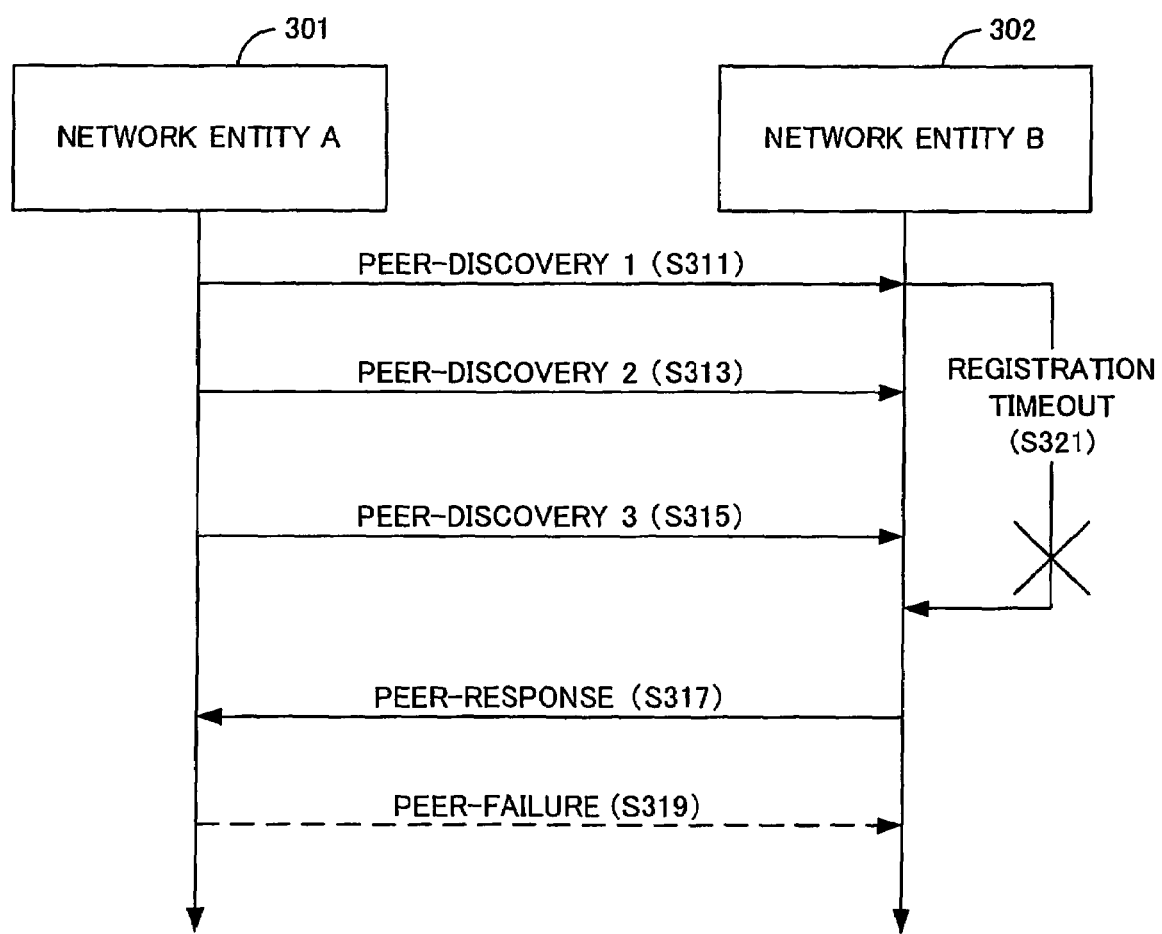
FIG. 3 is a diagram showing an example of a message exchange sequence among network entities in the embodiment of the present invention.

With reference to FIG. 3, an example messages exchange sequence for the peer discovery phase is presented. FIG. 3 is a diagram showing an example of a message exchange sequence among network entities in the embodiment of the present invention. As shown in FIG. 3, Peer-Discovery messages would be sent over Link (111), Link 2 (112), to Link n (113) from Network Entity A (301) to Network Entity B (302) (step S311, S313 and S315). When the Network Entity B (302) receives the first Peer-Discovery 1 (311) message with a specific Network Entity Identifier, a timer is triggered at its Peer Relationship Controller (203) with a time limit of Registration-Time for that particular identifier. During this period, the Network Entity B (302) will gather all received Peer-Discovery messages with the same Network Entity Identifier, and process them together. A response will only be generated after the timeout of that timer, as indicated by step S321 in FIG. 3.

It is obvious to anyone skilled in the art that Network Entity B (302) may receive Peer-Discovery message with different Network Entity Identifiers. And the same operation procedure described above will apply to them accordingly, e.g. different timers will be established for each of the Network Entity Identifiers.

The value of the Registration-Time depends on the configuration of the Network Entity (201) the Peer Relationship Controller (203) resides in. Usually, it can take the value of the possible maximum delay difference between all the links present at the Network Entity (201). For example, when all the links are layer 2, the value could be in the degree of milliseconds. It is obvious to anyone skilled in the art that the value of the Registration-Time would not affect the effective operation of the present invention.

As shown in FIG. 3, network entity peers need to decide which one should send the Peer-Discovery message and which one should generate the response. In a general case, one of the network entity acts as a network access provider, e.g. an access point of the WLAN, and the other network entity acts as the client, e.g. a mobile terminal. In this situation, the network access provider, e.g. the access point, will have a Network-Side flag set in its Peer Relationship Controller (203) to signify its role. Once the Peer Relationship Controller (203) observes this flag, it would not send the Peer-Discovery message. Instead, it will listen for it, i.e. act as Network Entity B (302). The Network-Side flag can be set at the network entity boot up time, e.g. when an IEEE802.11 node is assigned as the access point. It is obvious to anyone skilled in the art that the setting of the flag at other time would not affect the effective operation of the invention.

When the two network entities operates at the ad hoc mode, e.g. non-infrastructure mode of the IEEE802.11, or there are mixed states for different links of the network entity, both entities will send Peer-Discovery message over the link. This would create extra traffic on the link, but it would not affect the correct operation of the Peer Relationship Controller (203).

Figure 4:
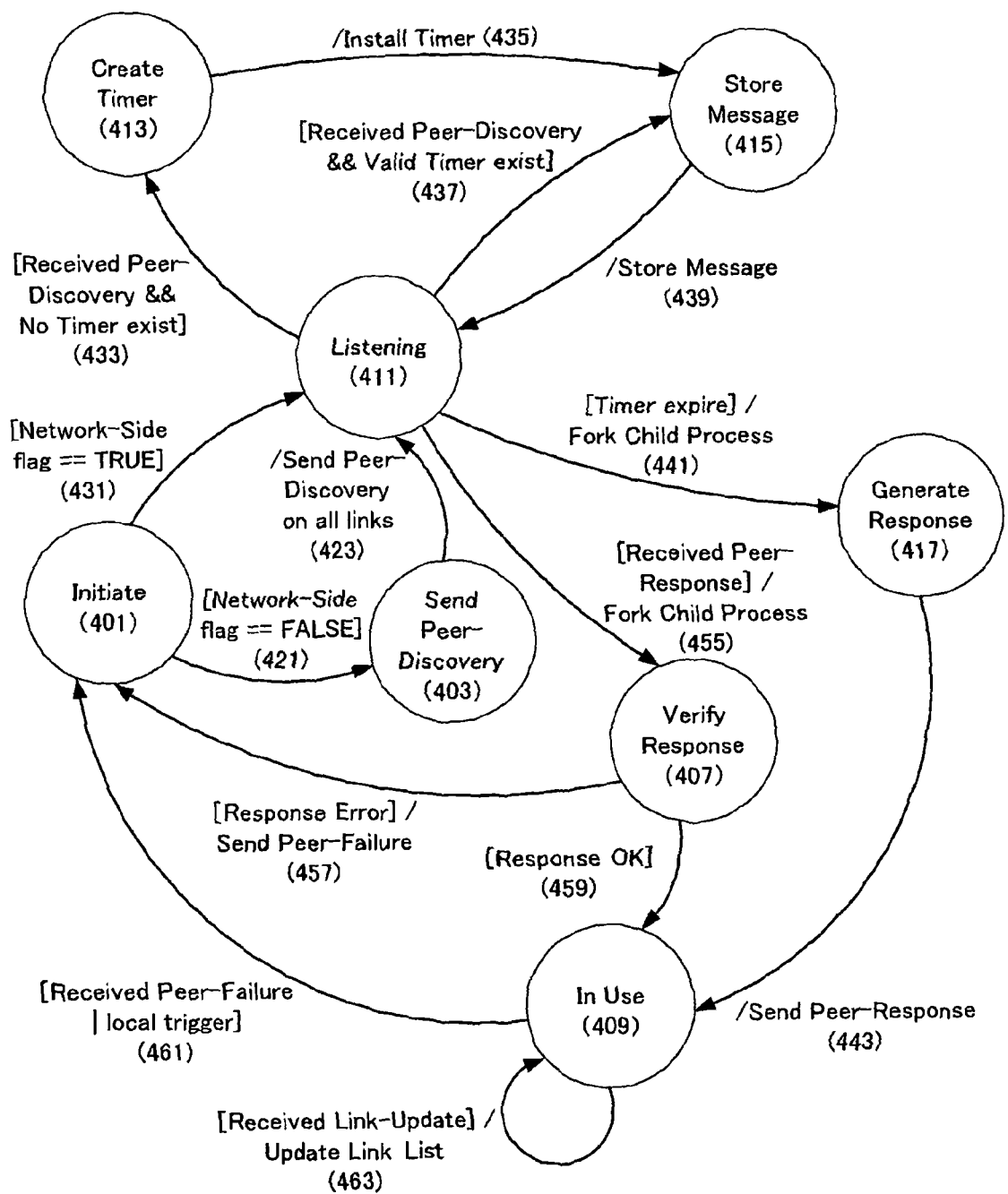
FIG. 4 is a state transition diagram showing an example of a message sequence among the network entities in the embodiment of the present invention.

With reference to FIG. 4, an example state of the possible Peer Relationship Controller (203) is described. FIG. 4 is a state transition diagram showing an example of a message sequence among the network entities in the embodiment of the present invention. The Peer Relationship Controller (203) starts with the "Initiate" (401) state. In this state, it will request the Network Entity Identifier to be generated by the ID Controller (202). After obtaining the unique identifier, the Peer Relationship Controller (203) checks if the Network-Side flag is set at the Network Entity (201). If the Network-Side flag is set to "TRUE", the Peer Relationship Controller (203) would transit to the "Listening" (411) state, as indicated by transition 431 (Network-Side flag==TRUE). If the Network-Side flag is "FALSE", the Peer Relationship Controller (203) would transit to the "Send Peer Discovery" (403) state, as indicated by transition 421 (Network-Side flag==FALSE).

In the "Send Peer-Discovery" (403) state, the Peer Relationship Controller (203) generates the Peer-Discovery message as described earlier according to each of the link's states. At the same time, the Peer Relationship Controller (203) will store the Link Specific Token of the Peer-Discovery message in its local Verification Buffer (not shown in the drawings), indexed with the Internal Link Identifier. This Verification Buffer could be a local temporary memory block, or part of a database. The Peer Relationship Controller (203) would then forward the Peer-Discovery message to the Link Control Logic (205) to dispatch on corresponding active links. After this, the Peer Relationship Controller (203) would transit to the "Listening" (411) state, as indicated by transition 423 (/Send Peer-Discovery on all links).

In the "Listening" (411) state, the Peer Relationship Controller (203) would depend on the Link Control Logic (205) to pass any received message regarding the peer relationship management to it. As mentioned earlier, these messages can come in with different form depending on the underlying media technology in use on individual links. The Link Control Logic (205) will parse those received message, and translates them into the proper format for Peer Relationship Controller (203)'s process.

When the Peer Relationship Controller (203) receives a Peer-Discovery message in the "Listening" (411) state, it will first retrieve the embedded Network Entity Identifier, and check with its local timer list, and verify if a Registration timer for that particular identifier exists. If no such timer exists, the Peer Relationship Controller (203) would transit to the "Create Timer" (413) state, as indicated by transition 433 ([Received Peer-Discovery && No Timer Exist]). In the "Create Timer" (413) state, the Peer Relationship Controller (203) creates a timer with a lifetime of Registration-Time, and associates it with the Network message. As mentioned above, the value of the Registration-Time could be locally decided by the Network Entity (201) based on its own preference. The choice of the timer length should normally be quite short, e.g. far less then 1 second. The Peer Relationship Controller (203) would then transit to the "Store Message" (415) state, as indicated by transition 435 (/Install Timer), after the timer is properly installed.

In the Store Message state, the received message would be processed, and a corresponding entry will be created in a local storage, e.g. in a Receive Buffer, or in a local database. In order for the proper response generation, the information should be stored with grouping based on the Network Entity Identifier. For example, an entry for storing the information could be:

Peer Info Entry::=

[Primary Key::=Network Entity Identifier]

[Secondary Key::=Internal Link Identifier]

[Link Specific Token]

[Internal Link Identifier of Receiving Link]

wherein, the Network Entity Identifier and Internal Link Identifier are identical to those of the received Peer-Discovery message. The Link Specific Token also equals the value of that in the received Peer-Discovery message. The Internal Link Identifier of Receiving Link is the local identifier the receiving Network Entity (201) allocated for its link that the Peer-Discovery message is received on.

This Internal Link Identifier could be of any local format the Network Entity (201) prefers to use, e.g. an integer.

When the information is stored in the temporary message, the Peer Relationship Controller (203) will transit back to the "Listening" (411), as indicated by transition 439 (/Store message).

When in the "Listening" (411) state, a Peer-Discovery message arrives with a Network Entity Identifier value that has a valid timer associated with it, the Peer Relationship Controller (203) will transit to the "Store Message" (415) state as indicated by transition 437 ([Received Peer-Discovery && Valid Timer exist]).

At the "Listening" (411) state, when a timer expires, the Peer Relationship Controller (203) will check if all of its active links are covered by the list associated with the timer. If there are still any links which are not described in the list, or there still exists another timer, the Peer Relationship Controller (203) will fork a child process and have it transit to the "Generate Response" (417) state, as indicated by transition 441 ([Timer expire]/Fork Child Process). The main process will still keep in the "Listening" (411) state to manage other links. If all the links are covered by the list, the Peer Relationship Controller (203) will transit directly to "Generate Response" (417) state.

In the "Generate Response" (417) state, the Peer Relationship Controller (203) will retrieve all the entries with a primary key equal to that associated with the expired timer, and process them together. For all these entries, the Peer Relationship Controller (203) assumes they are from the same peer Network Entity. The Peer-Response message to be created is to verify that, and also inform the peer Network Entity of the observation. Generally, to this end, the Peer-Response message should contain a Verification Token derived from all the Link Specific Token of the entries with the same Network Entity Identifier. The Peer-Response message should also contain a list of the Internal Link Identifier of these entries. This will help the peer Network Entity that receives the Peer-Response message to identify which links are connected to the same peer network entity. An example format of the possible implementation of the Peer-Response message is as following:

Peer-Response::=

[Message Type::=Peer-Response]

[Verification Token]

[List of Internal Link Identifier]

[Network Entity Identifier]

wherein the Verification Token is derived from the Link Specific Token of all the entries processed together. An example method of generating the Verification Token could be:

Verification Token::=H (Internal Link Identifier 1|Link Specific Token 1|Internal Link Identifier 2|Link Specific Token 2| , , , |Internal Link Identifier n|Link Specific Token n);

wherein H is a hash function, e.g. SHA1 (see the Non-Patent Document 2), and the input in the bracket are concatenation of all the Internal Link Identifiers and corresponding Link Specific Token of the received Peer-Discovery messages with the same Network Entity Identifiers. It is obvious to anyone skilled in the art that there are other ways to derive the Verification Token, as long as it is understood by both the Network Entities peers.

The Network Entity Identifier included in the Peer-Response message is the identifier generated by the ID Controller (202) of the Network Entity (201) the Peer Relationship Controller (203) resides on.

When the Peer-Response message is generated, the Peer Relationship Controller (203) passes it to the Link Control Logic (205). Along with the Peer-Response message passed is a list of the internal Link Identifier of the Receiving Link obtained from those Peer Info Entries, associated with the corresponding Network Entity Identifier. The Link Control Logic (205) will forward the Peer-Response message to the peer network entity using one of the listed links, so that only one copy of the Peer-Response would be received at the peer network entity, e.g. as shown by step S317 in FIG. 3. The Link Control Logic (205) can decide which link use based on its preference or other configurations. For example, the Link Control Logic (205) could choose a link with the least delay, or the highest bandwidth to forward the message. Since different link would use different transport format, the Link Control Logic (205) also needs to adapt the Peer-Response message accordingly, so that the message could be correctly transmitted over the link.

After sending the Peer-Response message, the Peer Relationship Controller (203) would transit to the "In Use" (409) state, as indicated by transition 443 (/Send Peer-Response). In this state, the Peer Relationship Controller (203) will trigger the Link Control Logic (205) to install the link list passed down. An example of the link list of the possible implementation is as following:

PeerLinkList::=

[peer Network Entity Identifier]

[list of Internal Link Identifier]

wherein the Network Entity Identifier signifies the peer network entities on the other end of the link, and the list of the Internal Link Identifier is for the Network Entity itself to manage its own links. The Link Control Logic (205) will check its local Management Buffer if such an entry with the same Network Entity Identifier exists. If it exists, the Link Control Logic (205) will merge them, e.g. append the new list to the existing entry. If no entry with the same Network Entity Identifier exists, the Link Control Logic (205) will create a new entry in its Management Buffer indexed with the Network Entity Identifier and containing the list of Link identifiers. When in use, the Link Control Logic (205) can interchangeably use the links in the list to forward a message to the peer entity. For example, if the Communication Entity (204) sends a message towards the peer network entity, the Link Control Logic (205) can make use of the list in the Management Buffer to pick a proper link to use. The Link Control Logic (205) selects the link to use based on its preference, or some configurations, e.g. selects the link with lower cost, lower delay, higher bandwidth, or a combination of the above factors.

In the "Listening" (411) state, if the Peer Relationship Controller (203) receives a Peer-Response message over one of its links, it will check if the response is covering all its active links, e.g. if the list of Internal Link Identifiers covers all local links. If there are links not covered in the response, the Peer Relationship Controller (203) will fork a child process, and transit to the "Verify Response" (407) state, as indicated by transition 455 ([Received Peer–Response]/Folk Child Process). Otherwise, the Peer Relationship Controller (203) will directly transit to "Verify Response" (407) state.

In the "Verify Response" (407) state, the Peer Relationship Controller (203) will check the received Peer-Response message and verify it against its own record saved in the Verification Buffer. For example, the Peer Relationship Controller (203) will try to derive the Verification Token based on the Link Specific Token saved in the Verification Buffer for those links listed in the List of Internal Link Identifier of the received Peer-Response message. Same function as mentioned above for generating the Verification Token for the Peer-Response message at state "Generate Response" (417) would be utilized.

If the derived Verification Token based on the information saved in the Verification Buffer matches that of the received Peer-Response message, it means the response is trustworthy. The Peer Relationship Controller (203) will then transit to the "In Use" (409) state, as indicated by transition 459 ([Response OK]). During this process, the Peer-Relationship Controller (203) will pass the link list together with the Network Entity Identifier received in the Peer-Response message to the Link Control Logic (205). The Link Control Logic (205) will place that into its Management Buffer, and enforce it. If there is existing entry with the same Network Entity Identifier, the Link Control Logic (205) should check if the existing entry's link list is a subset of the new one received from the Peer Relationship Controller (203). If it is, the new list will replace the existing list. Otherwise, the Link Control Logic (205) could choose to modify the Network Entity Identifier, and inform the Communication Entity (204) through the interface (224) to use the new identifier to address the peer network entity. Or, the Link Control Logic (205) could send a Peer-Failure message with an error code to indicate to the peer that the Network Entity Identifier it uses is in confliction with others (as shown by step S319 in FIG. 3), and all the negotiation should start again with a new identifier to be generated.

In the "Verify Response" (407) state, if the Peer Relationship Controller (203) finds that the derived Verification Code is different from that of the received Peer-Response, it will transit to the "Initiate" (401) state, and send out the Peer-Failure message to the peer network entity, as indicated by transition 457 ([Response Error]/Send Peer-Failure) in FIG. 4. The Peer-Failure message will carry an error code to indicate to the peer that the Peer-Response failed the verification. This means the Network Entity Identifier generated by the ID Controller (202) is in confliction with that of the other network entities. Therefore, the whole peer discovery process to start again from generating a new Network Entity Identifier for all the affected links. The Peer Relationship Controller (202) will record down the previous used Network Entity Identifier to ensure that the newly generated identifier is different from the Network Entity Identifier leading to error.

In the "In Use" (409) state, when the Peer Relationship Controller (203) received a Peer-Failure message, as indicated by transition 461 ([Received Peer-Failure|local trigger]) in FIG. 4, it will transit to the "Initiate" (401) state. By checking the error code, the Peer Relationship Controller (203) would be able to identify the cause. An example format used by a possible implementation of the Peer-Failure message is as following:

Peer-Failure::=
[Message Type::=Peer-Failure]
[Network Entity Identifier]
[Error Code]
  [Additional Info Element]

wherein, the Error Code provides information about the cause of the error. For example, it could indicate that the error is the Peer-Response failed verification. It is obvious to anyone skilled in the art that the Error Code can take any format in implementation, e.g. ASCII strings or integers.

As mentioned earlier, after the Peer-Response message being verified, both peer Network Entities will be able to choose sending messages using any of the links between them, e.g. any link from Link 1 (111) to Link n (113). To prevent abuse of the peer relationship, the further message exchanges, e.g. Peer-Failure, etc, need to have security protection. This could be achieved easily by making use of the Link Specific Token, similar to the generation of Verification Token in the Peer-Response message. For example, the peer network entities could derive the security association by:

Security-Association::=H (Internal Link Identifier n|Link Specific Token n| , , |Internal Link Identifier 2|Link Specific Token 2|Internal Link Identifier 1|Link Specific Token 1);

wherein, the H is a hash function same at both peer network entities, e.g. SHA1 (see the Non-Patent Document 2). Using this simple method, the Security-Association generated could be used to encrypt or authenticate the messages, so that security could be achieved. It is obvious to anyone skilled in the art that other methods could be used to derive the security associations without affecting the general principle of the present invention.

There are cases where the link between the two network entities is connected at different time. For example, Link 2 (112) between Network Entity A (101) and Network Entity B (102) may only be established after a long time the other links are in use. This case could be well handled by the above mentioned procedure. For example, when the Link 2 (112) is established, the Network Entity A (101) can send another Peer-Discovery message towards Network Entity B (102). Therefore, the Peer Relationship Controller (203) at Network Entity B (102) will then generate another Peer-Response message towards the Network Entity A (101), which will update a list in the Management Buffer of the Link Control Logic (205) at both Network Entity A (101) and Network Entity B (102). This effectively adds the Link (112) to the list.

During the communication, certain links could be dropped from the peer relationship, e.g. when a handover happens, Link 1 (111) may not lay between Network Entity A (101) and Network Entity B (102). In this case, Network Entity A (101) would send a Link-Update message to Network Entity B (102) through one of the remaining link, e.g. Link 2 (112).

When the Peer Relationship Controller (203) at Network Entity B (102) receives this Link-Update message in the "In Use" (409) state, it will verify the message with security association mentioned earlier. If the message is verified, the Peer Relationship Controller (203) will update corresponding Link 1 (111) related entry in its memory, e.g. remove the Peer Info Entry from its local memory storage, etc. At the same time, the Peer Relationship Controller (203) informs the Link Control Logic (205) to remove that specific link from its list in the Management Buffer. The Peer Relationship Controller (203) will transit back to the "In Use" (409) state after the above process, as indicated by transition 463 ([Received Link-Update]/Update Link List).

In certain situations, it is possible that all the links between the two network entity peers are disconnected. In such a case, the Link Control Logic (205) should be able to detect the interruption, and send a local trigger to the Peer Relationship Controller (203). In this case, the Peer Relationship Controller (203) will transit from the "In Use" (409) state to the "Initiate" (401) state, as indicated by transition 461 ([Received Peer-Failure|Local trigger]).

There may be cases when two network entity peers are disconnected and are no longer able or require communication with each other without the knowledge of the Link Control Logic (205). This may be the case when two peers were communicating in an infrastructure controlled network but without the assistance of the Access Point or Controller (Direct Mode) and one of them has moved away. It may therefore be prudent to provide a mechanism for graceful expiration of entries that no longer serve any productive purpose. It would be obvious to anyone skilled in the art that a variety of mechanisms exist in order to achieve this desired result. A simple mechanism would be the use of a "lifetime" variable in order to achieve the expiration of said entries. The lifetime value attached to entries may be communicated across peers or arbitrarily assigned by the network entity based on factors such as policy or knowledge of the type of peer. Said lifetime may be refreshed each time any form of communication is detected to or from the target peer.

INDUSTRIAL APPLICABILITY

The present invention has the advantage that a network entity capable of discovering and identifying which of one or more communication links of the network entity are connected to the same other network entity.

Thus, the present invention can be applied to the field of data communication using the data communication network, in particular the field of data communication using multiple links.

The invention claimed is:

1. A network entity capable of discovering and verifying which of a plurality of its communication links is connected to the same peer network entity, the network entity comprising:
   an identifier controller configured for generating a unique identifier for the network entity; and
   a peer relationship controller configured for transmitting a peer-discovery message to another network entity, the peer-discovery message comprising the generated unique identifier, a link specific token for the communication link which the peer-discovery message is transmitted on, and a local link identifier for the communication link which the peer-discovery message is transmitted on, and for receiving another peer-discovery message from another network entity, the received peer-discovery message comprising another unique identifier, another link specific token, and another local link identifier,
   the peer relationship controller being further configured for transmitting a peer-response message to the other network entity indicated by the other unique identifier.

2. The network entity according to claim 1, further comprising a receive buffer configured for storing, in association with the other unique identifier contained in the received peer-discovery message, the other link specific token contained in the received peer-discovery message, the other local link identifier contained in the received peer-discovery and an internal link identifier indicating the link on which the peer-discovery message has been received.

3. The network entity according to claim 2, further comprising a timer being associated with a particular unique identifier and starting with a predetermined lifetime when receiving a peer-discovery message with the particular unique identifier for the first time;
   the peer relationship controller being further configured for transmitting the peer-response message to a network entity indicated by the particular unique identifier, when the timer associated with the particular unique identifier expires, the peer-response message being based on the information stored in the receive buffer in association with the particular unique identifier.

4. The network entity according to claim 3, wherein the peer-response message comprises information on:
   the particular unique identifier associated with the expired timer;
   a verification token;
   a list of local link identifiers stored in association with the particular unique identifier; and
   a list of internal link identifiers stored in association with the particular unique identifier.

5. The network entity according to claim 4, wherein the verification token is generated based on information comprising a link specific token stored in association with the particular unique identifier.

6. The network entity according to claim 1, further comprising a link control logic which is capable of delivering a message generated by the peer relationship controller to another network entity by configuring the message to a format used by the communication link for transmission.

7. The network entity according to claim 6, wherein the link control logic further comprises a management buffer which is capable of storing a unique identifier associated with a list of local link identifiers or internal link identifiers passed from the peer relationship controller.

8. The network entity according to claim 7, wherein the peer relationship controller passes a list of internal link identifiers with a unique identifier that is contained in a peer-response message to the link control logic after sending the peer-response message to another network entity.

9. The network entity according to claim 7, wherein the peer relationship controller is configured so as to pass a list of local link identifiers with a unique identifier that is contained in a peer-response message to the link control logic after a peer-response message is received from another network entity and a verification code matches a verification token.

10. The network entity according to claim 7, wherein the link control logic is capable of interchangeably using the communication links identified by the list of internal link identifiers or local link identifiers as associated with a unique identifier stored in the management buffer when delivering a message to a network entity associated with the unique identifier.

11. The network entity according to claim 6, wherein the peer relationship controller is capable of assigning or receiving assignations of a lifetime variable which indicates a length of time for which a peer entry is useful after which the peer entry may continue to be maintained or discarded at the discretion of the peer relationship controller.

12. The network entity according to claim 11, wherein the lifetime variable is refreshed upon detection of communication to or from a specified peer in the peer entry.

13. The network entity according to claim 6, wherein the link control logic is capable of sending an indication to the peer relationship controller when detecting a disconnection of a communication link, and the peer relationship controller updates its state accordingly when receiving the indication.

14. The network entity according to claim 1, wherein the peer relationship controller further comprises a verification buffer for storing information on transmitted peer-discovery messages; and wherein the peer relationship controller is further configured for generating a verification code when receiving a peer-response message, the verification code being generated based on comprising the link specific token stored in the verification buffer and being associated with a local link identifier listed in the received peer-response message; and for generating a peer-failure message when the verification code does not match a verification token of the received peer-response message.

15. The network entity according to claim 14, wherein the peer-failure message comprises information on:

a unique identifier contained in the received peer-response message; and an error code that indicates a reason for sending the peer-failure message.

16. The network entity according to claim 14, wherein the peer relationship controller is further configured for recording the generated unique identifier when receiving a peer-failure message from another network entity.

17. The network entity according to claim 14, wherein the peer relationship controller is further configured for generating a security association, when sending out or receiving a peer-response message, by using information stored in a receive buffer or the verification buffer comprising a link specific token associated with a local link identifier in a list of local link identifiers of the peer-response message, the security association being used to protect further message exchange after sending or receiving the peer-response message.

18. The network entity according to claim 1, wherein the identifier controller is configured for generating the unique identifier based on information, the information comprising:

information related to the plurality of communication links of the network entity;

information of one or more of the network entity's credentials; or a combination of one or more of the information related to the plurality of communication links of the network entity and the information of one or more of the network entity's credentials.

19. The network entity according to claim 1, wherein the peer relationship controller is further configured for storing a flag indicating whether the peer relationship controller needs to generate and send out a peer-discovery message.

20. A peer relationship management method executing on a hardware computer in a data communication network for discovering and verifying which of a plurality of communication links of a network entity is connected to the same peer network entity, the method comprising the steps of:

generating a unique identifier for the network entity;

transmitting a peer-discovery message to another network entity, the peer-discovery message comprising the generated unique identifier, a link specific token for the communication link which the peer-discovery message is transmitted on, and a local link identifier for the communication link which the peer-discovery message is transmitted on;

receiving another peer-discovery message from another network entity, the received peer-discovery message comprising another unique identifier, another link specific token, and another local link identifier; and transmitting a peer-response message to the other network entity indicated by the other unique identifier.

21. The method according to claim 20, further comprising the step of storing, in a receive buffer and in association with the other unique identifier contained in the received peer-discovery message, the other link specific token contained in the received peer-discovery message, the other local link identifier contained in the received peer-discovery message, and an internal link identifier indicating the link on which the peer-discovery message has been received.

22. The method according to claim 21, further comprising the steps of:

starting a timer associated with a particular unique identifier with a predetermined lifetime when receiving a peer-discovery message with the particular unique identifier for the first time; wherein the peer-response message is transmitted to a network entity indicated by the particular unique identifier, when the timer associated with the particular unique identifier expires, the peer-response message being based on the information stored in the receive buffer in association with the particular unique identifier.

23. The method according to claim 22, wherein the peer-response message comprises information on:

the particular unique identifier associated with the expired timer;

a verification token;

a list of local link identifiers stored in association with the particular unique identifier; and a list of internal link identifiers stored in association with the particular unique identifier.

24. The method according to claim 23, wherein the verification token is generated based on information comprising a link specific token stored in association with the particular unique identifier.

25. The method according to claim 20, further comprising the steps of:

storing information on transmitted peer-discovery messages in a verification buffer; and generating a verification code when receiving a peer-response message, the verification code being generated based on information comprising a link specific token stored in the verification buffer and being associated with a local link identifier listed in the received peer-response message; and generating a peer-failure message when the verification code does not match a verification token of the received peer-response message.

26. The method according to claim 25, wherein the peer-failure message comprises information on:
- a unique identifier contained in the received peer-response message; and
- an error code that indicates a reason for sending the peer-failure message.

27. The method according to claim 25, further comprising the step of recording the generated unique identifier when receiving a peer-failure message from another network entity.

28. The method according to claim 25, further comprising the step of generating a security association, when sending out or receiving a peer-response message, by using information stored in a receive buffer or the verification buffer comprising a link specific token associated with a local link identifier in a list of local link identifiers of the peer-response message, the security association being used to protect further message exchange after sending or receiving the peer-response message.

29. The method according to claim 20, wherein the unique identifier is generated based on information, the information comprising:
- information related to the plurality of communication links of the network entity;
- information of one or more of the network entity's credentials; or
- combination of one or more of the information related to the plurality of communication links of the network entity and the information of one or more of the network entity's credentials.

30. The method according to claim 20, further comprising the step of storing a flag indicating whether the network entity needs to generate and send out a peer-discovery message.

* * * * *

UNITED STATES PATENT AND TRADEMARK OFFICE
CERTIFICATE OF CORRECTION

PATENT NO. : 8,069,235 B2
APPLICATION NO. : 11/995198
DATED : November 29, 2011
INVENTOR(S) : Tien-Ming Benjamin Koh et al.

It is certified that error appears in the above-identified patent and that said Letters Patent is hereby corrected as shown below:

Claim 2, column 12, line 9, reads:
"link identifier contained in the received peer-discovery and an"
and should read:
"link identifier contained in the received peer-discovery message, and an"

Claim 14, column 13, line 23, reads:
"erated based on comprising the link specific token stored"
and should read:
"erated based on information comprising the link specific token stored"

Claim 29, column 16, line 8, reads:
"combination of one or more of the information related to"
and should read:
"a combination of one or more of the information related to"

Signed and Sealed this
Fifteenth Day of May, 2012

David J. Kappos
*Director of the United States Patent and Trademark Office*